US012707227B2

(12) United States Patent
Mowlaee et al.

(10) Patent No.: US 12,707,227 B2
(45) Date of Patent: Aug. 11, 2026

(54) METHOD FOR PROCESSING AUDIO INPUT DATA AND A DEVICE THEREOF

(71) Applicant: GN Audio A/S, Ballerup (DK)

(72) Inventors: Pejman Mowlaee, Ballerup (DK); Rasmus Kongsgaard Olsson, Ballerup (DK); Karim Haddad, Ballerup (DK)

(73) Assignee: GN AUDIO A/S, Ballerup (DK)

( * ) Notice: Subject to any disclaimer, the term of this patent is extended or adjusted under 35 U.S.C. 154(b) by 178 days.

(21) Appl. No.: 18/433,868

(22) Filed: Feb. 6, 2024

(65) Prior Publication Data

US 2024/0276171 A1 Aug. 15, 2024

(30) Foreign Application Priority Data

Feb. 9, 2023 (EP) .................................... 23155741

(51) Int. Cl.
*H04S 7/00* (2006.01)
*G10L 21/02* (2013.01)
(Continued)

(52) U.S. Cl.
CPC .............. *H04S 7/305* (2013.01); *H04S 7/301* (2013.01); *H04S 2400/09* (2013.01)

(58) Field of Classification Search
CPC . H04S 7/305; H04S 7/301; H04S 7/00; H04S 2400/09; H04S 5/00;
(Continued)

(56) References Cited

U.S. PATENT DOCUMENTS 5,621,724 A * 4/1997 Yoshida ................ H04M 9/082 370/290
10,897,570 B1 * 1/2021 Robinson .................. G06T 7/50
(Continued)

OTHER PUBLICATIONS

Laurent et al, "Robust Automatic Speech Recognition in Reverberant Environments by Model Selection", International Workshop on Hands-Free Speech Communication, pp. 147-150, (IDS) (Year: 2001).*

(Continued)

*Primary Examiner* — Leshui Zhang
(74) *Attorney, Agent, or Firm* — HSML P.C.

(57) ABSTRACT

A computer-implemented method for processing audio input data into processed audio data by using an audio device comprising a microphone, a processor device and a memory holding a plurality of neural networks is presented. The plurality of neural networks are associated with different room types, wherein each room type is associated with one or more reference room acoustic metrics. The method comprises obtaining, by the microphone, room response data, wherein the room response data is reflecting room acoustics of a room in which the audio device is placed, determining, by using the processor device, the one or more room acoustic metrics based on the room response data, and selecting, by using the processor device, a matching neural network among the plurality of neural networks by comparing the one or more room acoustic metrics with the one or more reference room acoustic metrics associated with the different room types associated with the plurality of neural networks.

11 Claims, 2 Drawing Sheets

(51) Int. Cl.

| | |
|---|---|
| ***G10L 21/0264*** | (2013.01) |
| ***G10L 25/03*** | (2013.01) |
| ***G10L 25/27*** | (2013.01) |
| ***G10L 25/30*** | (2013.01) |
| ***G10L 25/48*** | (2013.01) |

(58) Field of Classification Search

CPC . G10L 21/0264; G10L 21/02; G10L 21/0208; G10L 21/0232; G10L 21/0216; G10L 25/30; G10L 25/03; G10L 25/27; G10L 25/48; G06F 3/165; H04R 3/00; H04R 3/005; H04R 1/406; H04R 25/507; H04R 25/554; H04R 25/407; H04R 25/00; H04R 25/50; H04M 9/082; H04M 3/002; H04M 3/568; H03G 5/165

USPC ........ 301/63, 66, 61, 71.8, 71.11, 71.12, 26, 301/309, 72, 73.1, 74, 83, 93, 94.1, 94.2, 301/94.3, 94.794, 95, 96, 97, 98, 99, 100, 301/101, 102, 103, 108, 112, 113, 114, 301/115, 119, 121, 122; 704/233, 202, 704/270, 272; 700/94

See application file for complete search history.

(56) References Cited

U.S. PATENT DOCUMENTS

| | | | | |
|---|---|---|---|---|
| 10,959,018 | B1 * | 3/2021 | Shi | G06N 3/09 |
| 2017/0278513 | A1 * | 9/2017 | Li | G10L 15/20 |
| 2017/0339504 | A1 * | 11/2017 | Bharitkar | H04S 3/004 |
| 2020/0312346 | A1 * | 10/2020 | Fazeli | G06N 3/0475 |

OTHER PUBLICATIONS

Zezario et al., "Specialized Speech Enhancement Model Selection Based on Learned Non-Intrusive Quality Assessment Metric", Proceedings Interspeech, ISCA, pp. 3168-3172, (IDS) Sep. 2019.*

The extended European search report issued in 23155741.4, dated Jul. 3, 2023.

Couvreur et al: "Robust Automatic Speech Recognition in Reverberant Environments by Model Selection", International Workshop on Hands-Free Speech Communication, Apr. 2001.

Bo Wu et al: "A Reverberation-Time-Aware Approach to Speech Dereverberation Based on Deep Neural Networks", IEEE Transactions on Audio, Speech, and Language Processing, vol. 25, No. 1, Jan. 2017.

Zezario et al: "Specialized Speech Enhancement Model Selection Based on Learned Non-Intrusive Quality Assessment Metric", Proceedings Interspeech, ISCA, Sep. 2019.

* cited by examiner

METHOD FOR PROCESSING AUDIO INPUT DATA AND A DEVICE THEREOF

TECHNICAL FIELD

The present invention relates to audio data processing, sometimes referred to as audio signal processing. More specifically, the disclosure relates to a method and a device for processing audio data by taking into account room acoustics.

BACKGROUND

Today, people worldwide are using smart speakers, conference speakers or other audio devices on an everyday basis for communicating with colleagues, business partners, family and friends, for listening to music, podcasts etc., and also, sometimes, for having information presented by a virtual assistant, e.g. Alexa provided by Amazon.com Inc. or Siri provided by Apple Inc. These audio devices are often equipped with a microphone, a speaker, a data communication device and a data processing device. The data communication device may be arranged to communicate with an external server directly, which may be the case for e.g. audio devices in cars, or it may be arranged to communicate with an external server via a gateway, which may be the case for smart speakers in a house. The data communication device may also be arranged such that audio data is transferred to the audio device from a computer or a mobile phone. For instance, this may be the case for Bluetooth™ speakers.

Many of these audio devices have both hardware and software configured for delivering high quality sound experiences. For instance, suppressing noise can be made for improving speech intelligibility. For audio devices, primarily intended to be used for generating speech data, i.e. audio data comprising speech, e.g. conference speakers, one way of suppressing noise is simply to remove audio components having a frequency outside a range for human speech. In this way, high frequency noise and also low frequency noise, i.e. audio components having a frequency above human speech or having a frequency below human speech, can be removed, which has the positive effect that the speech comes across more clearly. In case the audio data is transmitted from one conference speaker to another, these types of noise can be filtered out both at a transmitter device, sometimes referred to as a TX device, herein being the conference speaker capturing the speech, as well as at a receiver device, sometimes referred to as a RX device, herein being the conference speaker reproducing the speech.

In case the audio device is the conference speaker, or other device that can be used by several persons in a room, sound reflections caused by walls, ceiling and other objects in the room can be taken into account when reproducing the sound to e.g. improve speech intelligibility. The sound reflections may result in different types of sound distortions, e.g. echo and reverberation. A common approach today to moot such distortions is to take the room acoustics into account when configuring audio processing software of the receiver device. By having the software configured in this way, echo and reverberation typically arising in conference rooms may be compensated for. This approach may suppress echo and reverberation adequately for conference rooms of standard size, e.g. a room of 15-20 square meters, but not adequately when the conference speaker is used in a larger room, e.g. 30-40 square meters, or a smaller room, e.g. less than 10 square meters.

Today, there are different approaches for compensating for room acoustics, especially for high-end music speakers. It is for instance known to set up such speakers by moving a mobile phone, communicatively connected to the speaker or speakers, within the room during set up such that size and form of the room can be estimated and, once estimated, compensated for by having the software settings adjusted accordingly.

Even though some of the communication devices of today, such as the conference speaker, are configured to compensate for room acoustics, there is a need for improvement. By being able to more efficiently and more accurately compensate for the sound distortions related to the room in which the communication device is placed, the speech intelligibility may improved, i.e. the speech components of the sound generated by the communication device will be easier for the person or persons in the room to understand. By reducing the distortions, a user experience will also be improved in that listening for longer periods will be made easier. In addition, by being able to compensate for the room acoustics the user experience can also be improved for a person in the other end. An improved room acoustics compensation namely has the positive effect that the risk that sound produced by a speaker of the conference speaker is captured by the microphone of the same conference speaker. In this way, by having improved room acoustics compensation, for the person using a conference speaker in the other end, there will be less echo, and as an effect, the sound quality will be improved.

SUMMARY

According to a first aspect it is provided a computer-implemented method for processing audio input data into processed audio data by using an audio device comprising a microphone, a processor device and a memory holding a plurality of neural networks, wherein the plurality of neural networks are associated with different room types, wherein each room type is associated with one or more reference room acoustic metrics, said method comprising

- obtaining, by the microphone, room response data, wherein the room response data is reflecting room acoustics of a room in which the audio device is placed,
- determining, by using the processor device, the one or more room acoustic metrics based on the room response data, and
- selecting, by using the processor device, a matching neural network among the plurality of neural networks by comparing the one or more room acoustic metrics with the one or more reference room acoustic metrics associated with the different room types associated with the plurality of neural networks.

The room response data may be room impulse response data, that is, response data received in response to an audio signal. The room response data may be an audio signal obtained by the microphone of the audio device. The room response data may be a known audio signal which have undergone modulation based on the acoustics of the room in which it has been outputted. The known audio signal may be a test audio signal. The known audio signal may be an audio signal received from a far-end audio device.

Room types according to the present disclosure may be understood as different room with different acoustic properties, e.g., due to the size of the room, the acoustic properties of materials in the room, etc.

A matching neural network may in the present disclosure be understood as a neural network having been trained on audio data representative of a room type matching the determined one or more room acoustic metrics.

An advantage with this is that neural networks specifically trained for different room types may be provided and by using the room acoustics metrics it can be determined which neural network to use for the room in which the audio device is placed. In this way, improved echo cancellation and dereverberation can be provided.

The one or more room acoustic metrics may comprise reverberation time for a given frequency band or a set of frequency bands, such as RT60, a Direct-To-Reverberant Ratio (DRR) and/or Early Decay Time (EDT).

Alternatively, or in addition, the one or more room acoustics may comprise a room impulse response (RIR).

The plurality of neural networks may comprise a generally trained neural network, and the generally trained neural network may be selected as the matching neural network in case no matching neural network is found by comparing the one or more room acoustics metrics with the one or more reference room acoustic metrics.

By having this generally trained neural network, it is made possible to provide efficient reduction of echo and dereverberation even though no matching neural network is found.

The generally trained neural network may be understood as a neural network trained on audio data representing a variety of different room types, such as two room types, three room types, four room types, or more room types.

Alternatively, if no matching neural network is found a more classical approach to echo reduction and/or dereverberation may be utilized. A more classical approach may comprise a linear echo canceller and a residual echo canceller configured to reduce echo.

The plurality of neural networks may have been trained with different loss functions, wherein the different loss functions differ in terms of trade-offs between different distortion types.

An advantage with having different loss functions for the different networks is that different neural networks are trained for different room types. As an effect a larger variety of room types can be handled. By way of example, the trade-off may constitute a trade-off between suppressing echo and near-end speech quality or the trade-off may be between dereverberation and speech quality.

One simple example of such a loss function may be formulated as:

$$L(X, \hat{X}) = \sum_{i=1}^{j} L_i(X, \hat{X}) W_i$$

Where L( ) denotes our loss, X denotes the target signal, $\hat{X}$ denotes the estimated signal, j denotes the distortion type, $L_i$( ) denotes the sub-loss associated with the specific distortion type, and $W_i$ denotes a weighting associated with the distortion type. Consequently, by adjusting $W_i$ different trade-off between different distortion types may be achieved.

An example of such formulation is provided in the paper 'TASK SPLITTING FOR DNN-BASED ACOUSTIC ECHO AND NOISE REMOVAL', Braun and Valero, 2022', where the final loss is expressed as weighted sum of terms associated with near-end speech integrity and echo estimates.

In this way, by using the one or more acoustic metrics, it is made possible to choose a smoother of more aggressive echo suppression by selecting a neural network with a loss function resulting in the smoother echo suppression or another neural network with another loss function resulting in the more aggressive echo suppression. By way of example, in case of a non-reverberant room, that is, a room giving rise to no or a low level of reverberation, which may be characterized in that a low RT60 value (i.e. the time it takes for the sound pressure level to reduce by 60 dB), it may be advantageous to have a neural network selected that is trained with a loss function which does not punish echo harshly. Such neural network may instead perform minor adjustments that do not introduce excessive processing artifacts, which may affect other parameters such as speech quality, noise, echo, etc. On the other hand, in case of a reverberant room, which may be characterized by a high RT60 value, it may be advantageous to choose a neural network trained with a loss function that punishes echo harshly, even though this may result in processing artifacts, which may negatively affect other parameters of the signal such as speech quality, noise, etc.

The audio input data and the processed audio data may be multi-channel audio data.

By multi-channel audio data it may be understood as audio data obtained by a plurality of microphones of the audio device, such as two or more microphones.

The audio device may comprise an output transducer, and the method may further comprise obtaining speech data originating from a far-end room via a data communication device, wherein the audio device may be placed in a near-end room, generating sound by using the output transducer using the speech data received, wherein the room response data captured by the microphone may be based on sound generated by the output transducer using the speech data.

Consequently, the need for a test signal is alleviated, and the determination of the one or more room acoustics metrics may be made in real-time during a conference session between a far-end device and the present audio device.

The room response data obtained by the microphone of audio device may then correspond to the sound generated by the output transducer based on the speech data modulated by the room transfer function (RTF). The audio device may then determine the one or more room acoustics metrics by comparing the room response data to the speech data before being outputted by the loudspeaker.

The method may further comprise processing the audio input data captured by the microphone in combination with the speech data received into the processed audio data by using the matching neural network.

By way of example, an advantage with feeding both the data captured by the microphone of the near-end device as well as the data captured by the microphone of a far-end device into the matching neural network is that the echo reduction can be improved further, that is, the risk of having a person in the far-end room to hear herself or himself in the sound produced by the far-end device can be further reduced.

The method may further comprise transferring the processed audio data to the far-end device placed in the far-end room, wherein the far-end device may be provided with an output transducer arranged to generate sound based on the processed audio data.

According to a second aspect it is provided an audio device comprising a microphone configured to obtain room response data, wherein the room response data is reflecting room acoustics of a room in which the audio device is placed, a memory holding a plurality of neural networks, wherein the plurality of neural networks are associated with different room types, wherein each room type is associated with one or more reference room acoustic metrics, a processor device configured to determine the one or more room acoustic metrics based on the room response data, and to select a matching neural network among the plurality of neural networks by comparing the one or more room acoustic metrics with the one or more reference room acoustic metrics associated with the different room types associated with the plurality of neural networks.

The same features and advantages as presented above with respect to the first aspect also apply to this second aspect.

The wording processor device should be construed broadly to both include a single unit and a combination of a plurality of units.

The one or more room acoustic metrics may comprise reverberation time for a given frequency band, such as RT60, a Direct-To-Reverberant Ratio (DRR) and/or Early Decay Time (EDT).

The plurality of neural networks may comprise a generally trained neural network, and the generally trained neural network may be selected as the matching neural network in case no matching neural network is found by comparing the one or more room acoustics metrics with the one or more reference room acoustic metrics.

The plurality of neural networks may have been trained with different loss functions, wherein the different loss functions differ in terms of trade-offs between different distortion types.

The audio device may further comprise a data communication device arranged to receive speech data from the far-end room, an output transducer arranged to generate sound based on the speech data received, wherein the room response data captured by the microphone may be based on sound generated by the output transducer using the speech data.

The processor device may further be arranged to process the audio input data captured by the microphone in combination with the speech data received into the processed audio data by using the matching neural network.

According to a third aspect it is provided a non-transitory computer-readable storage medium storing one or more programs configured to be executed by one or more processor devices of an audio device, the one or more programs comprising instructions for performing the method according to the first aspect.

The terms "hearing device", "audio device" and "communication device" used herein should all be construed broadly to cover any device configured to receive audio input data, i.e. audio data comprising speech, and to process this data. By way of example, the hearing device may be a conference speaker, that is, a speaker placed on a table or similar for producing sound for one or several users around the table. The conference speaker may comprise a receiver device for receiving the audio input data, one or several processors and one or several memories configured to process the audio input data into audio output data, that may be, audio data in which speech intelligibility has been improved compared to the received audio input data.

The audio device may be configured to receive the audio input data via a data communications module. For instance, the device may be a speaker phone configured to receive the audio input data via the data communications device from an external device, e.g. a mobile phone communicatively connected via the data communications module of the audio device. The device may also be provided with a microphone arranged for transforming incoming sound into the audio input data.

The audio device can also be a hearing aid, i.e. one or two pieces worn by a user in one or two ears. As is commonly known, the hearing aid piece(s) may be provided with one or several microphones, processors and memories for processing the data received by the microphone(s), and one or several transducers provided for producing sound waves to the user of the hearing aid. In case of having two hearing aid pieces, these may be configured to communicate with each other such that the hearing experience could be improved. The hearing aid may also be configured to communicate with an external device, such as a mobile phone, and the audio input data may in such case be captured by the mobile phone and transferred to the audio device. The mobile phone may also in itself constitute the audio device.

The hearing aid should not be understood in this context as a device solely used by persons with hearing disabilities, but instead as a device used by anyone interested in perceiving speech more clear, i.e. improving speech intelligibility. The audio device may, when not being used for providing the audio output data, be used for music listening or similar. Put differently, the audio device may be earbuds, a headset or other similar pieces of equipment that are configured so that when receiving the audio input data this can be transformed into the audio output data as described herein.

The audio device may also form part of a device not solely used for listening purposes. For instance, the audio device may be a pair of smart glasses. In addition to transforming the audio input data into the audio output data as described herein and providing the resulting sound via e.g. spectacles sidepieces of the smart glasses, these glasses may also present visual information to the user by using the lenses as a head up-display.

The audio device may also be a sound bar or other speaker used for listening to music or being connected to a TV or a display for providing sound linked to the content displayed on the TV or display. The transformation of incoming audio input data into the audio output data, as described herein, may take place both when the audio input data is provided in isolation, but also when the audio input data is provided together with visual data.

The audio device may be configured to be worn by a user. The audio device may be arranged at the user's ear, on the user's ear, over the user's ear, in the user's ear, in the user's ear canal, behind the user's ear and/or in the user's concha, i.e., the audio device is configured to be worn in, on, over and/or at the user's ear. The user may wear two audio devices, one audio device at each ear. The two audio devices may be connected, such as wirelessly connected and/or connected by wires, such as a binaural hearing aid system.

The audio device may be a hearable such as a headset, headphone, earphone, earbud, hearing aid, a personal sound amplification product (PSAP), an over-the-counter (OTC) audio device, a hearing protection device, a one-size-fits-all audio device, a custom audio device or another head-wearable audio device. The audio device may be a speaker phone or a sound bar. Audio devices can include both prescription devices and non-prescription devices.

The audio device may be embodied in various housing styles or form factors. Some of these form factors are earbuds, on the ear headphones or over the ear headphones. The person skilled in the art is well aware of different kinds of audio devices and of different options for arranging the audio device in, on, over and/or at the ear of the audio device wearer. The audio device (or pair of audio devices) may be custom fitted, standard fitted, open fitted and/or occlusive fitted.

The audio device may comprise one or more input transducers. The one or more input transducers may comprise one or more microphones. The one or more input transducers may comprise one or more vibration sensors configured for detecting bone vibration. The one or more input transducer(s) may be configured for converting an acoustic signal into a first electric input signal. The first electric input signal may be an analogue signal. The first electric input signal may be a digital signal. The one or more input transducer(s) may be coupled to one or more analogue-to-digital converter(s) configured for converting the analogue first input signal into a digital first input signal.

The audio device may comprise one or more antenna(s) configured for wireless communication. The one or more antenna(s) may comprise an electric antenna. The electric antenna may be configured for wireless communication at a first frequency. The first frequency may be above 800 MHZ, preferably a wavelength between 900 MHz and 6 GHz. The first frequency may be 902 MHz to 928 MHz. The first frequency may be 2.4 to 2.5 GHZ. The first frequency may be 5.725 GHz to 5.875 GHz. The one or more antenna(s) may comprise a magnetic antenna. The magnetic antenna may comprise a magnetic core. The magnetic antenna may comprise a coil. The coil may be coiled around the magnetic core. The magnetic antenna may be configured for wireless communication at a second frequency. The second frequency may be below 100 MHZ. The second frequency may be between 9 MHz and 15 MHz.

The audio device may comprise one or more wireless communication unit(s). The one or more wireless communication unit(s) may comprise one or more wireless receiver(s), one or more wireless transmitter(s), one or more transmitter-receiver pair(s) and/or one or more transceiver(s). At least one of the one or more wireless communication unit(s) may be coupled to the one or more antenna(s). The wireless communication unit may be configured for converting a wireless signal received by at least one of the one or more antenna(s) into a second electric input signal. The audio device may be configured for wired/wireless audio communication, e.g. enabling the user to listen to media, such as music or radio and/or enabling the user to perform phone calls.

The wireless signal may originate from one or more external source(s) and/or external devices, such as spouse microphone device(s), wireless audio transmitter(s), smart computer(s) and/or distributed microphone array(s) associated with a wireless transmitter. The wireless input signal(s) may origin from another audio device, e.g., as part of a binaural hearing system and/or from one or more accessory device(s), such as a smartphone and/or a smart watch.

The audio device may include a processing unit. The processing unit may be configured for processing the first and/or second electric input signal(s). The processing may comprise compensating for a hearing loss of the user, i.e., apply frequency dependent gain to input signals in accordance with the user's frequency dependent hearing impairment. The processing may comprise performing feedback cancelation, beamforming, tinnitus reduction/masking, noise reduction, noise cancellation, speech recognition, bass adjustment, treble adjustment and/or processing of user input. The processing unit may be a processor, an integrated circuit, an application, functional module, etc. The processing unit may be implemented in a signal-processing chip or a printed circuit board (PCB). The processing unit may be configured to provide a first electric output signal based on the processing of the first and/or second electric input signal(s). The processing unit may be configured to provide a second electric output signal. The second electric output signal may be based on the processing of the first and/or second electric input signal(s).

The audio device may comprise an output transducer. The output transducer may be coupled to the processing unit. The output transducer may be a loudspeaker. The output transducer may be configured for converting the first electric output signal into an acoustic output signal. The output transducer may be coupled to the processing unit via the magnetic antenna.

In an embodiment, the wireless communication unit may be configured for converting the second electric output signal into a wireless output signal. The wireless output signal may comprise synchronization data. The wireless communication unit may be configured for transmitting the wireless output signal via at least one of the one or more antennas.

The audio device may comprise a digital-to-analogue converter configured to convert the first electric output signal, the second electric output signal and/or the wireless output signal into an analogue signal.

The audio device may comprise a vent. A vent is a physical passageway such as a canal or tube primarily placed to offer pressure equalization across a housing placed in the ear such as an ITE audio device, an ITE unit of a BTE audio device, a CIC audio device, a RIE audio device, a RIC audio device, a MaRIE audio device or a dome tip/earmold. The vent may be a pressure vent with a small cross section area, which is preferably acoustically sealed. The vent may be an acoustic vent configured for occlusion cancellation. The vent may be an active vent enabling opening or closing of the vent during use of the audio device. The active vent may comprise a valve.

The audio device may comprise a power source. The power source may comprise a battery providing a first voltage. The battery may be a rechargeable battery. The battery may be a replaceable battery. The power source may comprise a power management unit. The power management unit may be configured to convert the first voltage into a second voltage. The power source may comprise a charging coil. The charging coil may be provided by the magnetic antenna.

The audio device may comprise a memory, including volatile and non-volatile forms of memory.

The audio device may comprise one or more antennas for radio frequency communication. The one or more antenna may be configured for operation in ISM frequency band. One of the one or more antennas may be an electric antenna. One or the one or more antennas may be a magnetic induction coil antenna. Magnetic induction, or near-field magnetic induction (NFMI), typically provides communication, including transmission of voice, audio and data, in a range of frequencies between 2 MHz and 15 MHz. At these frequencies the electromagnetic radiation propagates through and around the human head and body without significant losses in the tissue.

The magnetic induction coil may be configured to operate at a frequency below 100 MHZ, such as at below 30 MHz, such as below 15 MHZ, during use. The magnetic induction coil may be configured to operate at a frequency range between 1 MHz and 100 MHZ, such as between 1 MHz and 15 MHz, such as between 1 MHz and 30 MHz, such as between 5 MHz and 30 MHZ, such as between 5 MHz and 15 MHz, such as between 10 MHz and 11 MHz, such as between 10.2 MHz and 11 MHz. The frequency may further include a range from 2 MHz to 30 MHZ, such as from 2 MHz to 10 MHz, such as from 2 MHz to 10 MHz, such as from 5 MHz to 10 MHz, such as from 5 MHz to 7 MHz.

The electric antenna may be configured for operation at a frequency of at least 400 MHZ, such as of at least 800 MHZ, such as of at least 1 GHZ, such as at a frequency between 1.5 GHZ and 6 GHZ, such as at a frequency between 1.5 GHZ and 3 GHz such as at a frequency of 2.4 GHz. The antenna may be optimized for operation at a frequency of between 400 MHZ and 6 GHz, such as between 400 MHz and 1 GHZ, between 800 MHz and 1 GHZ, between 800 MHZ and 6 GHZ, between 800 MHz and 3 GHZ, etc. Thus, the electric antenna may be configured for operation in ISM frequency band. The electric antenna may be any antenna capable of operating at these frequencies, and the electric antenna may be a resonant antenna, such as monopole antenna, such as a dipole antenna, etc. The resonant antenna may have a length of $\lambda/4\pm10\%$ or any multiple thereof, A being the wavelength corresponding to the emitted electromagnetic field.

The present invention relates to different aspects including the audio device and the system described above and in the following, and corresponding device parts, each yielding one or more of the benefits and advantages described in connection with the first mentioned aspect, and each having one or more embodiments corresponding to the embodiments described in connection with the first mentioned aspect and/or disclosed in the appended claims.

BRIEF DESCRIPTION OF DRAWINGS

The above and other features and advantages will become readily apparent to those skilled in the art by the following detailed description of exemplary embodiments thereof with reference to the attached drawings, in which.

DETAILED DESCRIPTION

Figure 1:
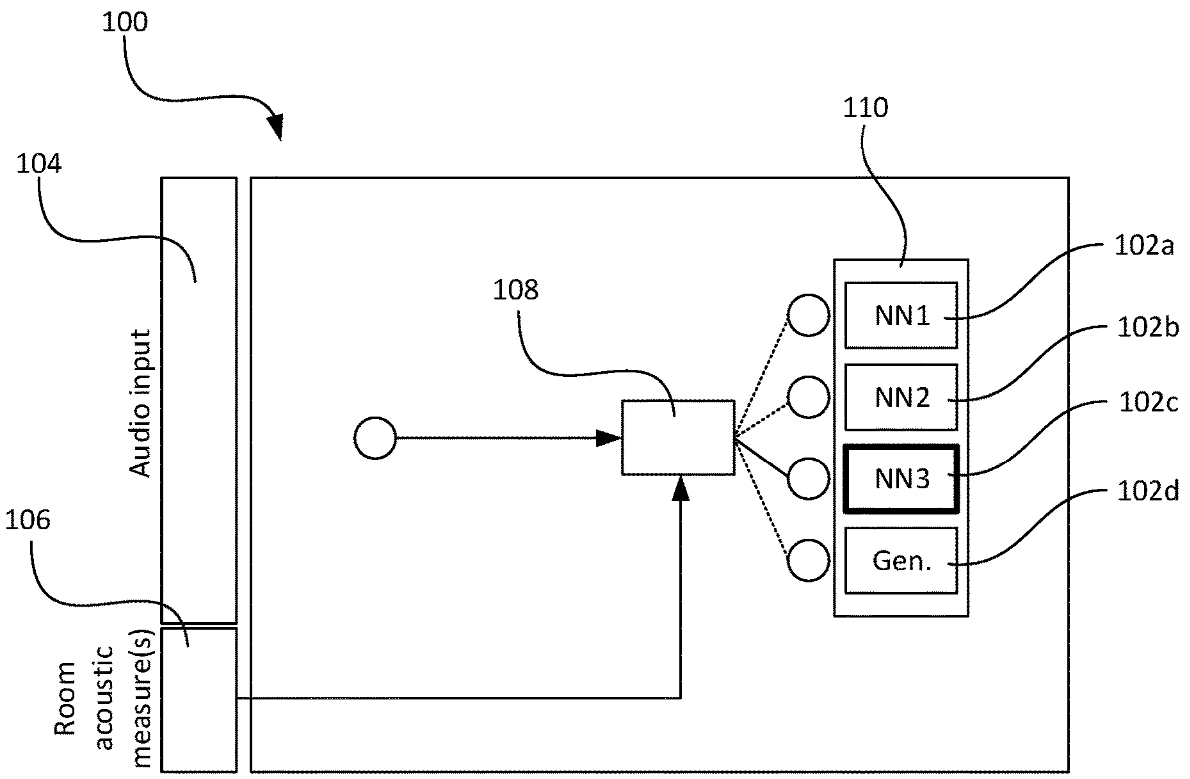
FIG. 1 illustrates a general principle for how room acoustics measures can be used as basis for selecting a neural network.

Various embodiments are described hereinafter with reference to the figures. Like reference numerals refer to like elements throughout. Like elements will, thus, not be described in detail with respect to the description of each figure. It should also be noted that the figures are only intended to facilitate the description of the embodiments. They are not intended as an exhaustive description of the claimed invention or as a limitation on the scope of the claimed invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

FIG. 1 illustrates a general principle of using a room acoustic metric as a selector for neural networks. As illustrated, an audio device 100 may hold a number of different neural networks 102*a*-102*d*. The different neural networks 102*a-d* may be associated with different room types. An advantage of having this number of neural networks 102*a-d* is that the acoustics of the room in which the audio device 100 is placed can be compensated for when e.g. suppressing echo and/or reverberation.

To be able to associate the room with the matching neural network 102*c* room response data 106 can be provided to the audio device 100. The room response data 106 may be data captured by a microphone of the audio device 100 itself or it may be audio data captured by a microphone of another audio device, e.g. a stand-alone microphone communicatively connected to the audio device 100. The room response data 106 can as the name suggests comprise data reflecting room acoustics of the room in which the audio device 100 is placed.

The room response data 106 may be obtained in response to sound generated by the audio device 100 itself for the purpose of determining room acoustics metrics. For instance, a test signal, a sound having a well-defined frequency, amplitude and duration, may be output from the audio device 100 and the room response data 106 may constitute reverberation and/or echo etc. originating from the test signal, e.g., the room response data 106 may then be in the form of the modulated test signal which have been modulated by the room acoustics, the room acoustics may then be determined by determining the modulation of the test signal. Another possibility is that the room response data 106 is formed in response to sound produced by the audio device 100 during a conference call, that is, sound produced based on data generated by a microphone in a far-end device. In a similar manner to the test signal, the signal received from the far-end is a known signal, then by comparing the far-end signal before being outputted by the loudspeaker and after being modulated by the room acoustics, the room acoustics may be determined.

Once having received the room response data 106, one or more room acoustic metrics may be determined by using a processor device 108 of the audio device 100. Generally, the room acoustic metrics may be any metrics that provides information on how sound waves provided in the room are affected by the room itself as well as objects placed in the room. By way of example, the one or more room acoustic metrics may comprise reverberation time for a given frequency band, e.g. RT60, a Direct-To-Reverberant Ratio (DRR) and/or Early Decay Time (EDT). The one or more room acoustic metrics may comprise a room impulse response (RIR), or a room transfer function (RTF). If the room impulse response is determined, the RT60 and other room acoustics may be determined based on the room impulse response.

Based on the room acoustic measures determined, the matching neural network 102*c* may be determined. This may be made by having each neural network 102*a-d* associated with one or more reference room acoustic metrics, i.e., different room types, and to find the matching network 102*c*, the room acoustic measures determined can be compared to the different reference room acoustic metrics. Once having found a neural network having matching room acoustic metrics among the neural networks 102*a-d* held in a memory 110 of the audio device 100, this neural network may be assigned as the matching network 102*c*. Different criteria may be used for comparison. For instance, in case there are several room acoustic metrics, these may be weighted differently. Even though it is herein disclosed as that one of the neural networks 102*a-d* is selected, it is also an option that several matching neural networks are selected even though not illustrated. If having a set up in which several matching neural networks are used, the audio data formed from the matching neural networks may be combined in a latter step before being transferred to e.g. a speaker. When stating a neural network has matching room acoustic metrics, it may be understood as the neural network being associated with one or more room acoustics metrics which are within a certain tolerance threshold of the determined one or more room acoustic metrics. The tolerance threshold may be determined via empirical data or may be set by an audio engineer during tuning of the audio device.

As illustrated, one of the neural networks 102*a-d* may be a generic neural network 102*d* that can be used if none of the other neural networks 102*a-c* is matching the room acoustic metrics determined. The generic neural network 102*d* may be trained based on data originating from all sorts of room types, while the other neural networks 102*a-c* may each be trained for a specific room type. As an alternative, instead of using the generic neural network 102*d* in case none of the others neural networks 102*a-c* are found matching, a non-neural network approach can be used. Put differently, a classical approach for suppressing echo and/or reverberation can be used. By way of example, an echo and/or reverberation suppression device using pre-programmed steps and/or thresholds may be used.

By way of example, a first neural network 102*a* may be associated with a one-person room of approximately 2 square meters and a second neural network 102*b* may be associated with an eight-person conference room of approximately 20 square meters. In addition to the size of the rooms, the room types may also differ in that they may be more or less crowded with people, in that they may more or less crowded with objects (e.g. furniture), in acoustic absorption, etc. For instance, the second neural network 102*c* may be associated with the eight-person conference room with four persons in the room and the audio device 100 placed on a table approximately in a center of the room. The third neural network 102*c* may on the other hand be associated with the eight-person conference room but with eight persons in the room and also with the audio device placed close to a wall of the room instead of in the center. Thus, the term "room type" should in this context be understood from an acoustics perspective. More particularly, this term is to be understood as that any room environment providing for a different type of acoustics is to be considered a specific room type. The level of detail, that is, how many different neural networks that are provided may depend on available storage space in the memory, as well as availability of data. More particularly, in case there is sufficient amount of data available for a certain room type, training a neural network for this room type is made possible. To meet that there may be room types not matching any of the available room types, the generic neural network 102*d* may be provided as explained above.

Regarding the alternative approach to use the generic neural network 102*d* in case no matching neural network can be found as discussed above, a traditional approach, above referred to as the classical approach, i.e. non-machine learning approach, may be used. An advantage with such arrangement is that in case there are some room types not covered by any of the neural networks 102*a-d* available due to that there has been no training data available, these can be handled by a number of pre-determined routines that may be providing a more reliable output than a poorly trained neural network. An example of such traditional processing is Residual Echo Suppression (RES). More particularly, the traditional processing may be so-called non-linear, harmonic distortion RES algorithms as described in the article "Non-linear residual acoustic echo suppression for high levels of harmonic distortion" by Bendersky et al. at University of Buenos Aires.

The room acoustic metrics used for selecting the matching neural network 102*c* may be a single metric or a combination of metrics. For example, the room acoustic metrics may be RT60, i.e. Reverberation Time 60, herein defined as the time required for the sound in a room to decay over a specific dynamic range, usually taken to be 60 dB. The RT60 or other similar acoustic descriptors may also be estimated based on a determined impulse response. By having the different neural networks 102*a-c*, apart from the generic neural network 102*d*, associated with different RT60 ranges, it is made possible to, once having the RT60 measure determined for the room of the audio device 100, to find the matching neural network 102*c*.

Figure 2:
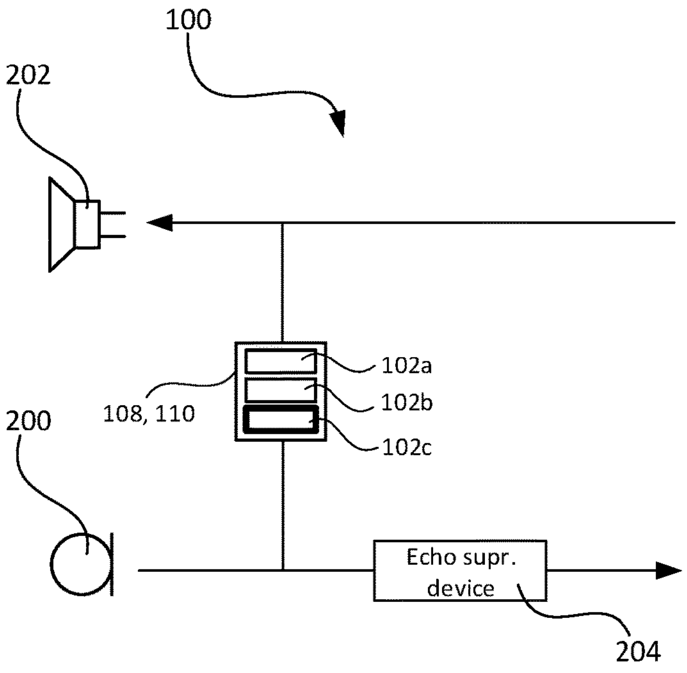
FIG. 2 illustrates how a data processing device comprising a memory holing a number of neural networks can be integrated into an audio device, wherein each neural network is trained for a specific room type.

Compensating for the room acoustics can be done in different ways. As illustrated in FIG. 2, the processor device 108 and the memory 110 holding the neural networks 102*a-c* may be arranged in the audio device 100 such that audio data captured by a microphone 200 is fed into the audio device 100 before, for instance, an echo suppression device 204 is used for removing or reducing echo in the captured audio data. The matching neural network 102*c* may be applied to the audio data before this is transferred to another audio device, e.g. another conference speaker placed in a far-end room. By having the processor device 108 and the memory arranged 110 as illustrated in FIG. 2, that is, direct access to the microphone 200 as well as the output transducer 202, e.g. speaker, it is made possible for the audio device 100 to identify the room acoustics metrics by transmitting the impulse signal via the output transducer 202 and receiving the impulse response signal via the microphone 200.

Figure 3:
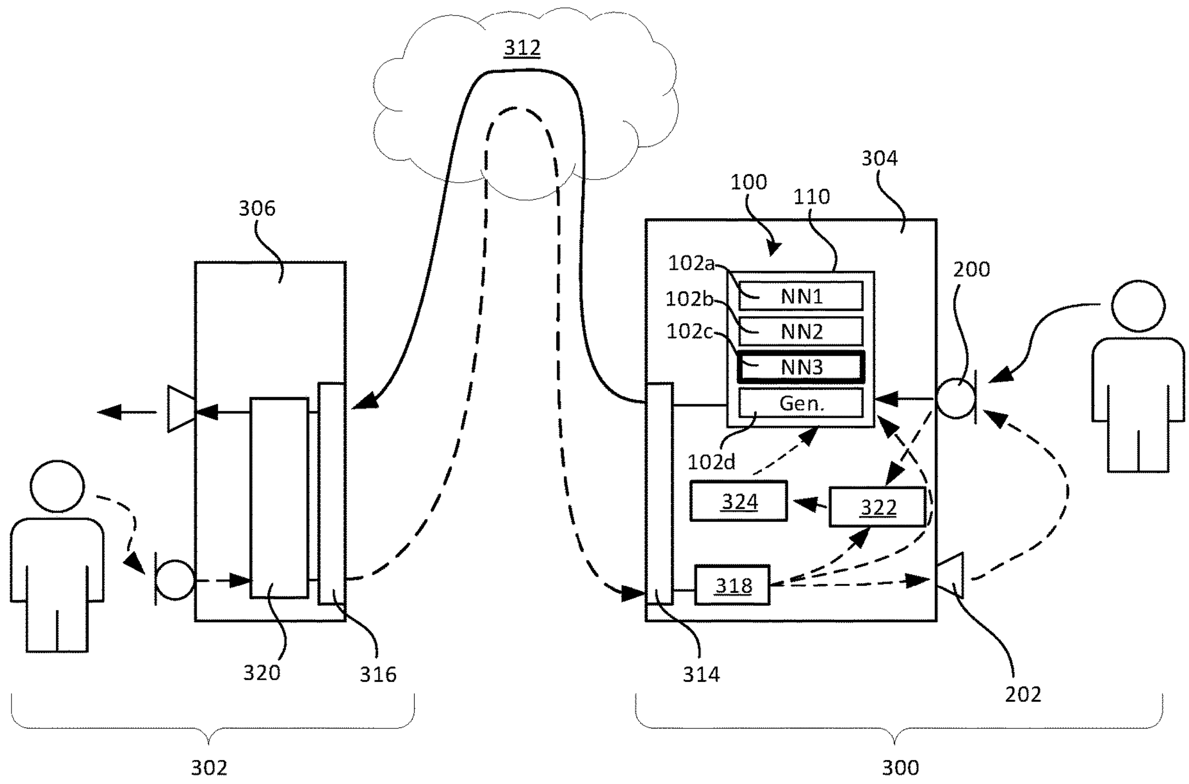
FIG. 3 illustrates a near-end device and a far-end device, wherein the near-end device is provided with the number of neural networks such that improved sound quality can be achieved in the far-end device.

FIG. 3 schematically illustrates an example with a near-end room 300 and a far-end room 302, wherein a near-end device 304 placed in the near-end room 300 comprises the audio device 100 and a far-end device 306 placed in the far-end room 302. The far-end device 306 may comprise another audio device, the other audio device at the far-end may be substantially identical to the audio device 100 at the near-end, or the other audio device at the far-end may differ from the audio device at the near-end. Using a set up as illustrated in this figures serves the purpose of reducing echo and preserving the quality of speech.

As illustrated by dashed lines, speech originating from a person speaking in the far-end room 302 may be transferred from a far-end data communication device 316 via a data communication network 312, e.g. a mobile data communication network, to a near-end data communication device 314. Far-end speech data, formed by a microphone of the far-end device 306 capturing the speech, may be processed by a far-end digital signal processor (DSP) before this is transferred to the near-end device 304, and, after having received the speech data by the near-end data communication device 314, the speech data may be processed by a near-end DSP 318. The processing in-between the near-end DSP 318 and the far-end DSP may comprise steps of encoding and decoding and/or steps of enhancing the signal.

As illustrated, the speech data may be transferred to and outputted from the speaker, i.e. output transducer 202, of the near-end device 304. In addition, the far-end speech data may be transferred to an impulse response estimator 322.

The far-end speech data outputted from output transducer 202 may be picked-up by microphone 200 to obtain modulated far-end speech data, where the modulated far-end speech data being the far-end speech data having been modulated by the acoustics of the near-end room. The modulated far-end speech data may be passed to the estimator 322. The estimator 322 may then use the far-end speech data and the far-end modulated speech data to determine one or more room acoustic metrics, such as an impulse response. The estimator 322 may comprise a linear echo canceller for determining an impulse response. The linear echo canceller may be configured to estimate the impulse response from far-end speech data and the corresponding microphone signal. In some embodiments the linear echo canceller may be configured to perform linear echo cancellation, while the selected neural network may be configured to perform residual echo cancellation. The linear echo canceller may comprise an adaptive filter configured for linear echo cancellation by a normalized least mean square method. The impulse response estimated by the impulse response estimator 322 may be transferred to a selector 324. The selector 324 can be configured to select the matching neural network 102*c* based on the determined one or more room acoustic metrics, also referred to as neural network models, among the neural networks 102*a-d*.

Once having selected the matching neural network 102*c*, based on output provided by the selector 324, near-end speech data, illustrated by solid lines, obtained by the microphone 200 of the near-end device 304 is processed by using the matching neural network 102*c*. As illustrated, the far-end speech data captured in the far-end room 302 may also be used as input to the matching neural network 102*c*. An advantage with this is that the echo suppression may be further improved.

Even though the example presented above is referring to speech data, it should be noted that the approach is not limited to speech data, but can be used for any type of audio data, and also speech data combined with other types of audio data. It should also be noted that even though not illustrated also the far-end device 306 may be equipped with the neural networks 102*a-d* such that echo suppression can be achieved in both directions.

Figure 4:
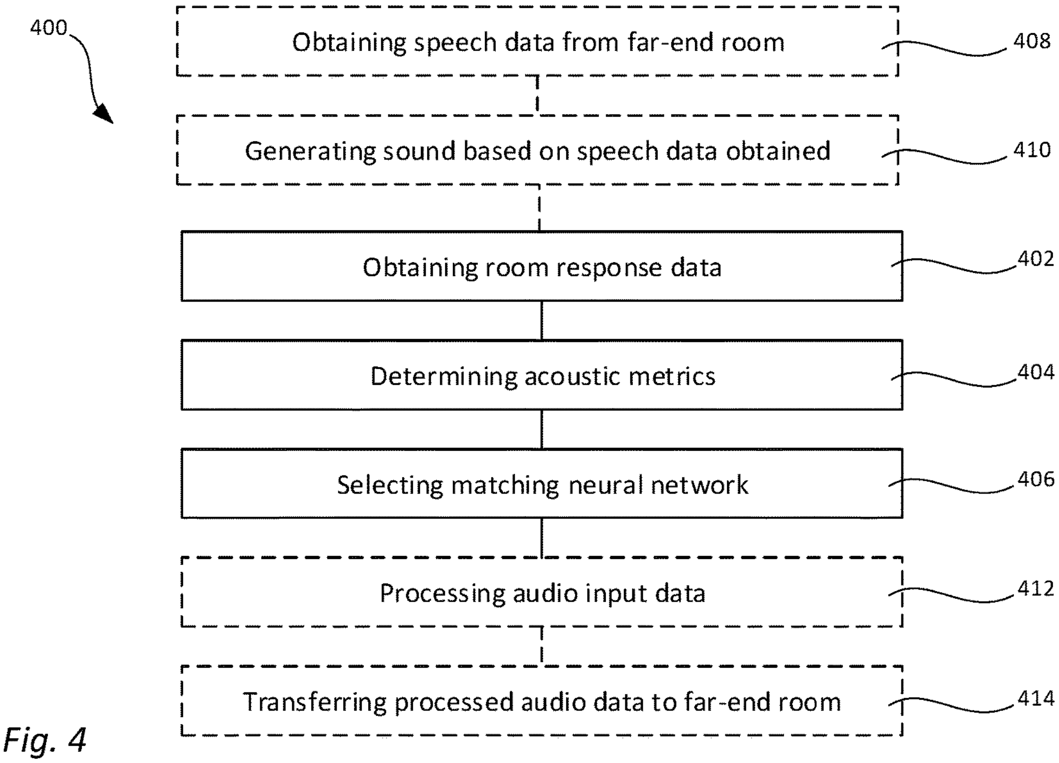
FIG. 4 is a flowchart illustrating a method for processing audio input data into processed audio data by using an audio device equipped with a number of neural networks trained for different room types.

FIG. 4 is a flowchart illustrating a method 400 for processing the audio input data 104 into the processed audio data. The room response data 106 may be obtained 402 by using the microphone 200 of the audio device 100. Based on the room response data 106, the one or more room acoustic metrics may be determined 404. By comparing the one or more room acoustic metrics with one or more reference room acoustic metrics associated with the different room types associated with the plurality of neural networks 102*a-d*, the matching neural network 102*c* can be determined 406.

Optionally, speech data originating from the far-end room 302 may be obtained 408 via the data communication device 314. The speech data obtained can be used for generating sound by using the output transducer 202. As an effect, the room response data captured by the microphone may be based on sound generated by the output transducer. This is in turn provides for that the selection 406 of the matching neural network 102*c* may be based on the room response data 106 in combination with the speech data received.

Optionally, the audio input data 104 captured by the microphone 200 in combination with the speech data received may be processed 412 into the processed audio data by using the matching neural network 102*c*.

Optionally, the processed audio data may be transferred 414 to a far-end device placed in the far-end room, wherein the far-end device may be provided with an output transducer arranged to generate sound based on the processed audio data.

Although particular features have been shown and described, it will be understood that they are not intended to limit the claimed invention, and it will be made obvious to those skilled in the art that various changes and modifications may be made without departing from the scope of the claimed invention. The specification and drawings are, accordingly to be regarded in an illustrative rather than restrictive sense. The claimed invention is intended to cover all alternatives, modifications and equivalents.

LIST OF REFERENCES

100—audio device
102*a-d*—neural networks
104—audio input data
106—room response data
108—processor device
110—memory
200—microphone
202—output transducer/speaker
204—echo suppression device
300—near-end room
302—far-end room
304—near-end device
306—far-end device
312—data communication network
314—near end data communication device
316—far end data communication device
318—near end DSP
320—far end DSP
322—impulse response estimator
324—selector

The invention claimed is:

1. A computer-implemented method for processing audio input data into processed audio data by using an audio device comprising a microphone, an output transducer, a processor device and a memory holding a plurality of neural networks, wherein the plurality of neural networks are associated with different room types, wherein each room type is associated with one or more reference room acoustic metrics, said computer-implemented method comprising:

obtaining speech data originating from a far-end room via a data communication device, wherein the audio device is placed in a near-end room, obtaining, by the microphone, room response data, wherein the room response data is reflecting room acoustics of a room in which the audio device is placed, wherein the room response data captured by the microphone is based on sound generated by the output transducer using the speech data originating from the far-end room and the reflecting room acoustics of the room, applying an adaptive filter to the speech data to provide an estimate of the reflecting room acoustics of the speech data in the room to provide an estimated echo signal, wherein the adaptive filter is configured for linear echo cancellation of the estimated echo signal to provide an echo cancelled signal and to minimize the echo cancelled signal using a normalized least mean square method, determining, by using the processor device, one or more room acoustic metrics based on the echo cancelled signal, wherein the one or more room acoustic metrics includes an impulse response and the determining includes determining a reverberation time based on the impulse response, selecting, by using the processor device, a matching neural network among the plurality of neural networks by comparing at least the reverberation time with the one or more reference room acoustic metrics associated with the different room types associated with the plurality of neural networks, processing the echo cancelled signal into the processed audio data by using the matching neural network, and generating a clean speech signal for the near-end room by using the output transducer using the processed audio data.

2. The computer-implemented method according to claim 1, wherein the reverberation time is for a given frequency band or a set of frequency bands.

3. The computer-implemented method according to claim 1, wherein the plurality of neural networks comprise a generally trained neural network, and the generally trained neural network is selected as the matching neural network in case no matching neural network is found by comparing the one or more room acoustics metrics with the one or more reference room acoustic metrics.

4. The computer-implemented method according to claim 1, wherein the plurality of neural networks have been trained with different loss functions, wherein the different loss functions differ in terms of trade-offs between different distortion types.

5. The computer-implemented method according to claim 1, wherein the audio input data and the processed audio data are multi-channel audio data.

6. The computer-implemented method according to claim 1, further comprising:

transferring the processed audio data to a far-end device placed in the far-end room, wherein the far-end device is provided with an output transducer arranged to generate sound based on the processed audio data.

7. A non-transitory computer-readable storage medium storing one or more programs configured to be executed by one or more processor devices of an audio device, the one or more programs comprising instructions for performing the method according to any one of the claim 1.

8. An audio device comprising:

a data communication device arranged to receive speech data from a far-end room, a microphone configured to obtain room response data, wherein the room response data is reflecting room acoustics of a room in which the audio device is placed, wherein the room response data obtained by the microphone is based on sound generated by an output transducer of the audio device using the speech data originating from the far-end room and the reflecting room acoustics of the room, a memory holding a plurality of neural networks, wherein the plurality of neural networks are associated with different room types, wherein each room type is associated with one or more reference room acoustic metrics, a processor device configured to:

apply an impulse response estimator, the impulse response estimator comprising a linear echo canceller to estimate the impulse response of the speech data and the reflecting room acoustics of the room, the linear echo canceller including an adaptive filter to apply to the speech data to provide an estimate of the reflecting room acoustics of the speech data in the room to provide an estimated echo signal, wherein the adaptive filter is configured for linear echo cancellation of the estimated echo signal to provide an echo cancelled signal and to minimize the echo cancelled signal using a normalized least mean square method, and determine one or more room acoustic metrics based on the echo cancelled signal, wherein the determining includes determining a reverberation time based on the impulse response, and to select a matching neural network among the plurality of neural networks by comparing at least the reverberation time with the one or more reference room acoustic metrics associated with the different room types associated with the plurality of neural networks, wherein the processor device is arranged to process the echo cancelled signal into the processed audio data by using the matching neural network, and the output transducer configured to output a clean speech signal for the near-end room using the processed audio data.

9. The audio device according to claim 8, wherein the reverberation time is for a given frequency band.

10. The audio device according to claim 8, wherein the plurality of neural networks comprise a generally trained neural network, and the generally trained neural network is selected as the matching neural network in case no matching neural network is found by comparing the one or more room acoustics metrics with the one or more reference room acoustic metrics.

11. The audio device according to claim 8, wherein the plurality of neural networks have been trained with different loss functions, wherein the different loss functions differ in in terms of trade-offs between different distortion types.

* * * * *